US010198217B2

(12) United States Patent
Li

(10) Patent No.: US 10,198,217 B2
(45) Date of Patent: Feb. 5, 2019

(54) METHOD AND SYSTEM OF ENHANCED RELIABILITY AND ERROR IMMUNITY IN FLASH STORAGE

(71) Applicant: Alibaba Group Holding Limited, George Town (KY)

(72) Inventor: Shu Li, Bothell, WA (US)

(73) Assignee: Alibaba Group Holding Limited (KY)

( * ) Notice: Subject to any disclaimer, the term of this patent is extended or adjusted under 35 U.S.C. 154(b) by 132 days.

(21) Appl. No.: 15/343,546

(22) Filed: Nov. 4, 2016

(65) Prior Publication Data

US 2018/0129452 A1 May 10, 2018

(51) Int. Cl.
*G06F 3/06* (2006.01)
*G06F 11/10* (2006.01)

(52) U.S. Cl.
CPC ............ *G06F 3/0659* (2013.01); *G06F 3/064* (2013.01); *G06F 3/0619* (2013.01); *G06F 3/0679* (2013.01); *G06F 11/1068* (2013.01)

(58) Field of Classification Search
None
See application file for complete search history.

(56) References Cited

U.S. PATENT DOCUMENTS

| | | | | |
|---|---|---|---|---|
| 5,436,913 | A | 7/1995 | Yamamura | |
| 8,151,166 | B2 | 4/2012 | Shalvi | |
| 8,271,737 | B2 | 9/2012 | Chen | |
| 9,361,991 | B1 * | 6/2016 | Ng | G11C 11/5628 |
| 9,858,002 | B1 * | 1/2018 | Goss | G06F 3/0619 |
| 2011/0149661 | A1 | 6/2011 | Rajwani | |
| 2014/0304560 | A1 * | 10/2014 | Narasimha | G06F 11/0727 714/704 |

* cited by examiner

*Primary Examiner* — Douglas King
(74) *Attorney, Agent, or Firm* — Van Pelt, Yi & James LLP

(57) ABSTRACT

A last written page in an open block in NAND flash is identified where the NAND flash includes a plurality of pages and the last written page has first content. Second content is written to an adjacent page in the open block, wherein the adjacent page is physically adjacent to the last written page in the open block and the second content enhances robustness of the first content.

20 Claims, 18 Drawing Sheets

METHOD AND SYSTEM OF ENHANCED RELIABILITY AND ERROR IMMUNITY IN FLASH STORAGE

BACKGROUND OF THE INVENTION

To reduce cost, improve speeds, and/or conserve power, manufacturers shrink the size or geometries of negative AND (NAND) flash storage up to 15 nm (after 15 nm, NAND goes to 3D stackable for density improvements, the feature size itself does not shrink). As NAND flash storage geometries get smaller, some adverse effects become more noticeable, such as the unintentional addition of charge (more generally, the introduction of noise) to cells, crosstalk or cell-to-cell interference, etc. Thus, smaller-featured devices can have higher error rates and poor data retention. Techniques to overcome such adverse effects would be desirable.

BRIEF DESCRIPTION OF THE DRAWINGS

Various embodiments of the invention are disclosed in the following detailed description and the accompanying drawings.

DETAILED DESCRIPTION

Figure 1:
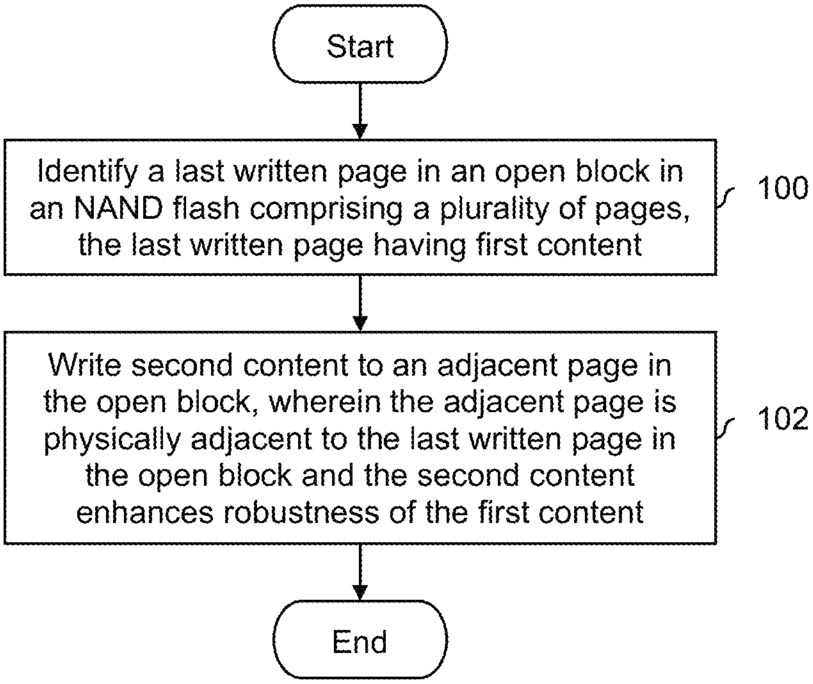
FIG. 1 is a flowchart illustrating an embodiment of a process to identify written pages which are susceptible to the addition of noise and prevent such an addition from occurring.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to mitigate the introduction of noise to an open block of a negative AND (NAND) flash memory are described herein. As will be described in more detail below, a last written page in an open block (e.g., with a plurality of pages) is identified. For example, as new write jobs come in, the last written page is updated to reflect the last page of the last write job. Second content (e.g., a pseudo-random binary sequence) is written to an adjacent page in the open block to protect the content of the last written page, where the adjacent page is physically adjacent to the last written page in the open block. As will be described in more detail below, in some embodiments, one or more criteria (e.g., relating to a time threshold and/or an error correction decoding result, such as whether the error correction decoding failed or a number of errors output by the (successful) error correction decoding process) are satisfied in order for the (physically) adjacent page to be written. Writing "overhead" or non-payload data to the adjacent page based on one or more criteria keeps the amount of overhead information written to the open block down.

FIG. 1 is a flowchart illustrating an embodiment of a process to identify written pages which are susceptible to the addition of noise and prevent such an addition from occurring. In some embodiments, the process is performed by a NAND flash controller (e.g., implemented on a processor, such as a general purpose processor, an application-specific integrated circuit (ASIC), a field-programmable gate array (FPGA), or any other appropriate device) which controls one or more NAND flash storages (e.g., also implemented on one or more semiconductors).

At 100, a last written page in an open block in an NAND flash comprising a plurality of pages is identified, the last written page having first content. For example, a NAND flash controller at any given time may have one or more open blocks in NAND flash storage to which data is written. The NAND flash controller can receive write jobs at varying arrival times from some higher-level entity (e.g., a host or an application). Each write job includes or is associated with one or more pages of data to be written. In some embodiments, the last page of the write job is flagged or otherwise identified (e.g., by the NAND flash controller) as the last written page at step 100. Naturally, if a new or next write job is received, the page which is identified as the last written page is updated to reflect the last page of the new write job.

At 102, second content is written to an adjacent page in the open block, wherein the adjacent page is physically adjacent to the last written page in the open block and the second content enhances robustness of the first content. For example, the second content which is written to the adjacent page can comprise a pseudo-random binary sequence (PRBS). Writing a PRBS to a page which is adjacent to the last written page can contribute the least amount of noise to the last written page, which is desirable. If too much noise is added to the last written page, the bit error rate for that page and/or the open block which contains that page can increase. Thus, the second content enhances robustness of the first content.

In some embodiments, step 102 is performed only for those last written pages which meet one or more criteria (e.g., some timer threshold is exceeded and/or some error correction decoding result). For example, if step 102 writes a PRBS to the adjacent page, that data is overhead data as opposed to payload data (e.g., from a write job), which is undesirable. To avoid writing too much and/or unnecessary overhead data to the NAND flash storage, step 102 in some embodiments is performed only when some criteria is met.

The following figures provide some examples which may help to better understand the process of FIG. 1. These examples are multi-level cell (MLC) examples where each NAND flash cell stores two bits, sometimes referred to as an upper page (or upper bit) and a lower page (or lower bit). Although the following examples are MLC examples, the techniques described herein apply to other types of NAND flash, such as single-level cells (SLC) where each NAND flash cell stores a single bit, triple (tri) level cells (TLC) where each NAND flash cell stores three bits, etc. First, an exemplary programming (i.e., write) sequence for MLC is described. Then, an exemplary open block is described where an adjacent page is written in order to protect one or more previously written pages in the open block.

Figure 2:
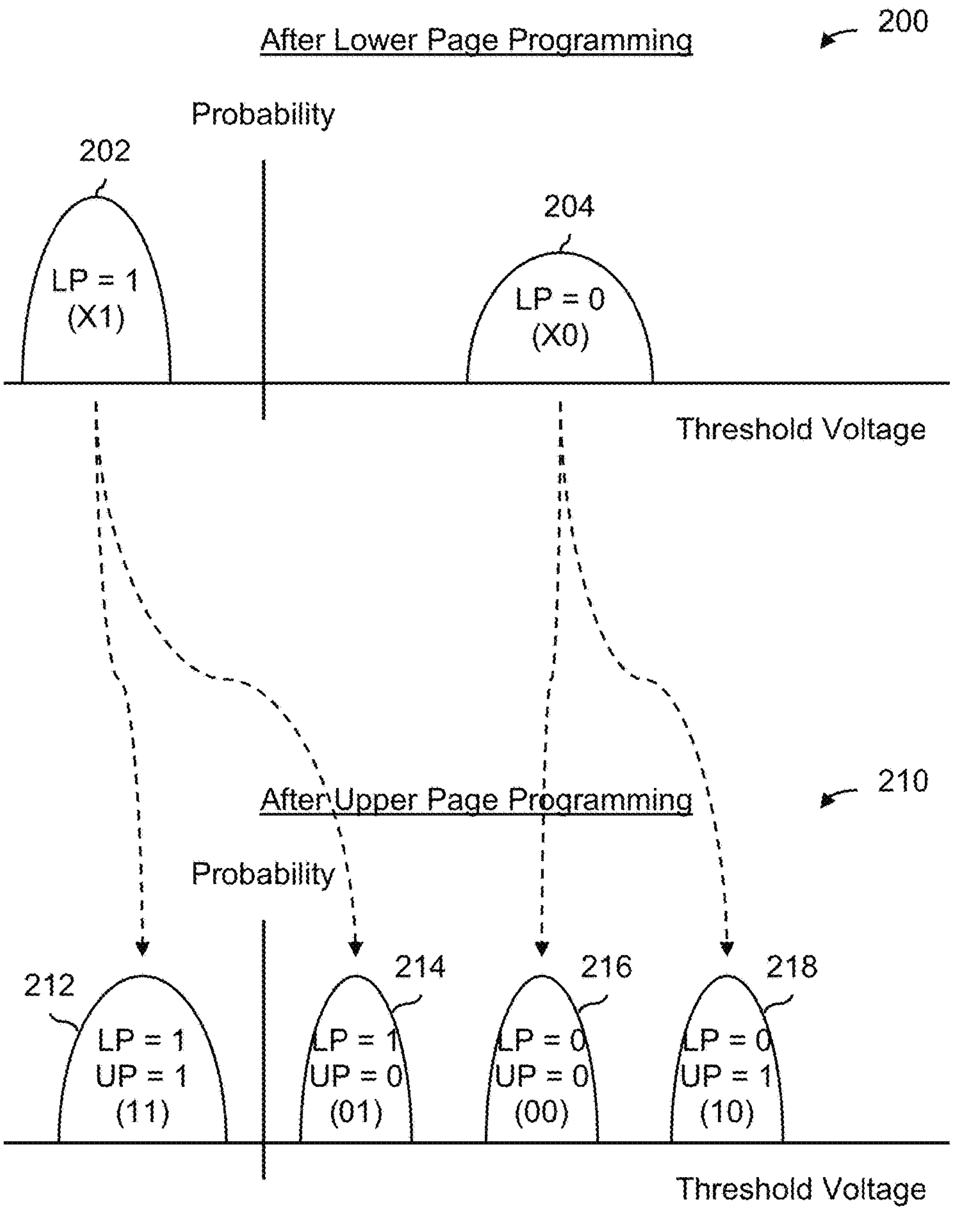
FIG. 2 is a diagram illustrating an embodiment of a programming sequence for MLC NAND flash.

FIG. 2 is a diagram illustrating an embodiment of a programming sequence for MLC NAND flash. In the example shown, programming is a two stage process. First, a lower page (bit) is programmed. Then, an upper page (bit) is programmed. Diagram 200 shows a threshold voltage distribution of the system after the lower page is programmed. Distribution 202 is associated with cells where the lower page is programmed (i.e., written) with a 1; distribution 204 is associated with cells where the lower page is programmed (i.e., written) with a 0. In this example, diagram 200 shows a probability distribution function (PDF) where the x-axis corresponds to threshold voltage and the y-axis corresponds to probability.

NAND flash cells store information in the form of voltage, sometimes referred to herein as a threshold voltage. Adding charge (voltage) to a NAND flash cell is not an exact process and so even if the lower page of two cells are both programmed to be a 0 (as an example), one cell might have slightly more (threshold) voltage than the other cell. As such, distribution 202 and distribution 204 are shown as "domes" where the mean of the distributions is typically close to the ideal or "perfect" threshold voltage for a given bit value. If programming were able to be done perfectly, distribution 202 and distribution 204 would instead resemble Dirac delta functions or impulse functions, where all of the cells programmed with a particular lower page value (i.e., LP=0 or LP=1) would have identical threshold voltages.

Diagram 210 shows the system after the upper page has been programmed. Cells in or associated with distribution 202 go to either distribution 212 (e.g., if the upper page is programmed with a 1) or distribution 214 (e.g., if the upper page is programmed with a 0). Similarly, cells in or associated with distribution 204 go to either distribution 216 (e.g., if the upper page is programmed with a 0) or distribution 218 (e.g., if the upper page is programmed with a 1). As shown in diagram 210, in this example, cells programmed with a 11 have the lowest threshold voltages, cells programmed with a 01 have the second lowest threshold voltages, cells programmed with a 00 have the second highest threshold voltages, and cells programmed with a 10 have the highest threshold voltages.

It is noted that the time gap between programming of the lower page (e.g., corresponding to diagram 200) and programming of the upper page (corresponding to diagram 210) can vary quite a bit. For example, suppose a write job is received. For pages corresponding to the beginning or middle of the write job, the programming of corresponding lower pages and upper pages will occur fairly close to each other because there is still data to be written. However, after the write job has completed, there can be one or more cells for which the lower page is programmed but the upper page is not. The system will remain in this state until the next write job is received, and in some cases the next write job will not be received for some time (e.g., hours, days, months, etc.).

When the system is in this state, some of the pages are susceptible to the addition of noise (e.g., the unintentional addition of charge (voltage)). The following figure shows an exemplary open block which illustrates this vulnerability in greater detail.

Figure 3:
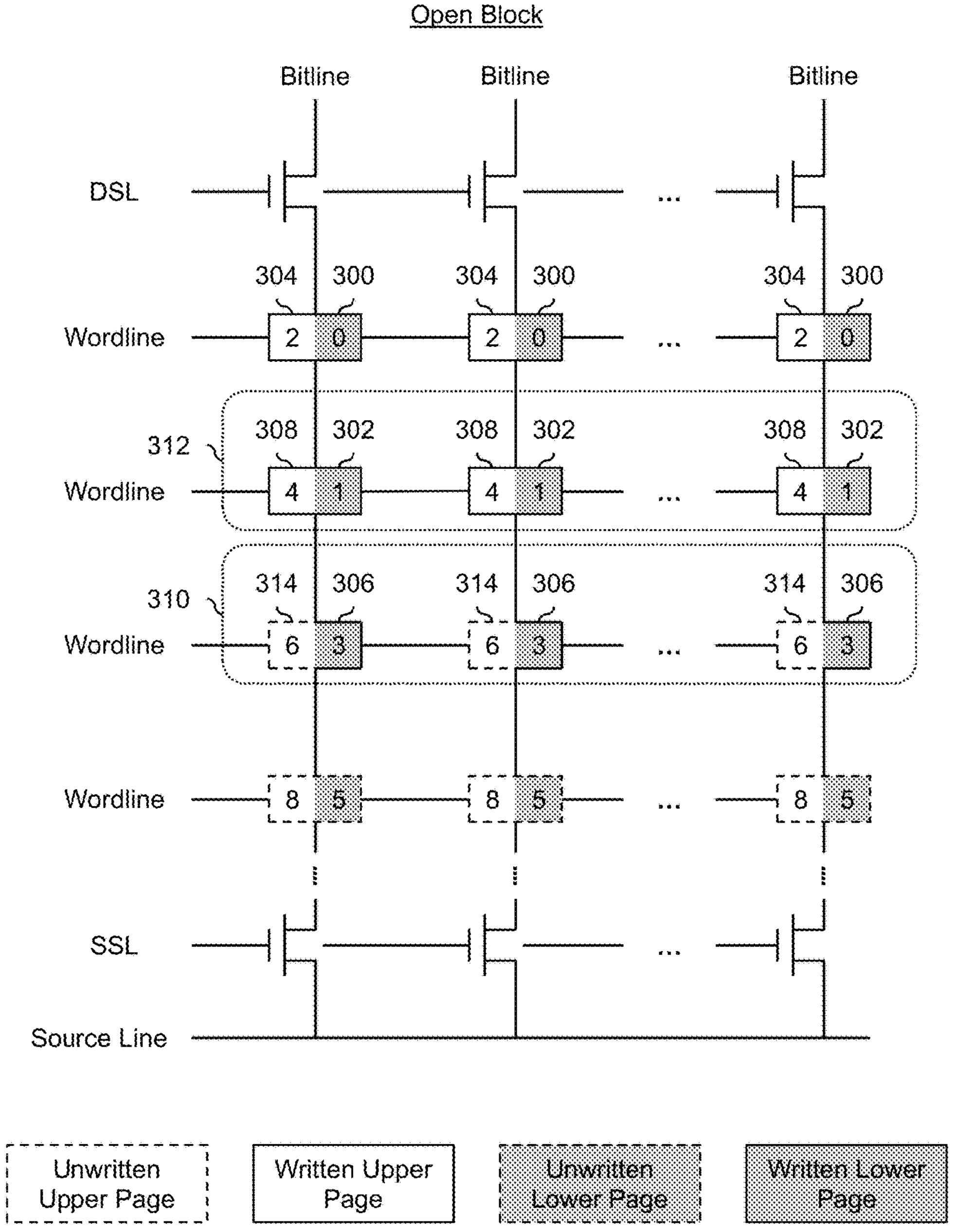
FIG. 3 is a diagram illustrating an embodiment of an open block with one or more pages which are vulnerable to the addition of noise.

FIG. 3 is a diagram illustrating an embodiment of an open block with one or more pages which are vulnerable to the addition of noise. In the example shown, the exemplary open block has an all bitline (ABL) scheme and has been partially written (i.e., some pages have been written but other pages have not been written). Upper pages are shown with a white background and lower pages are shown with a grey background. Pages which have been written are shown with a solid border and pages which have not been written are shown with a dotted border. Generally speaking, the wordline, drain select line (DSL), bitline, source select line (SSL), and source line are control signals. These control signals perform their standard functions, and for brevity are not discussed in detail here.

In this example, pages are written in sequential (i.e., ascending numerical) order. So, the cells associated with page 0 (300) are programmed first, followed by page 1

(302), page 2 (304), page 3 (306), and finally page 4 (308). The programming process stops or otherwise pauses after programming page 4, resulting in the open block shown here. It is noted that two pages which are adjacent to each other in the programming sequence are not necessarily physically adjacent to each other in the layout of pages shown here. For example, page 0 and page 2 share the same cells, page 1 and page 4 share the same cells, page 3 and page 6 (314) share the same cells, and so on. This layout is merely exemplary and may mitigate the unintended addition of charge. Thus, even though page 3 occurs immediately after page 2 in the programming sequence, the two pages are not physically next to each other (e.g., they are separated by the cells which include page 1 and page 4).

In the state shown (i.e., where page 4 is programmed but page 5 and onward are not), some of the cells are vulnerable to the addition of noise (e.g., the unintentional addition of charge to those cells). For example, the cells in wordline 310 are partially programmed (e.g., page 3 has been programmed but page 6 has not been programmed), which makes these cells vulnerable. Similarly, even though the cells in wordline 312 have been completely programmed (e.g., both page 1 and page 4 have been programmed), because a neighboring wordline (i.e., wordline 310) has not been completely programmed, the cells in wordline 312 are also vulnerable.

The cells in wordline 310 and/or wordline 312 can be protected by performing the process of FIG. 1 on the exemplary open block. For example, the last written page identified at step 100 in FIG. 1 in this example would be page 4. The adjacent page (e.g., which is written at step 102 in FIG. 1) in this example would be page 6. In this example, page 4 and page 6 are physically adjacent to each other.

The following figure shows the exemplary open page after page 6 has been programmed per step 102 in FIG. 1.

Figure 4:
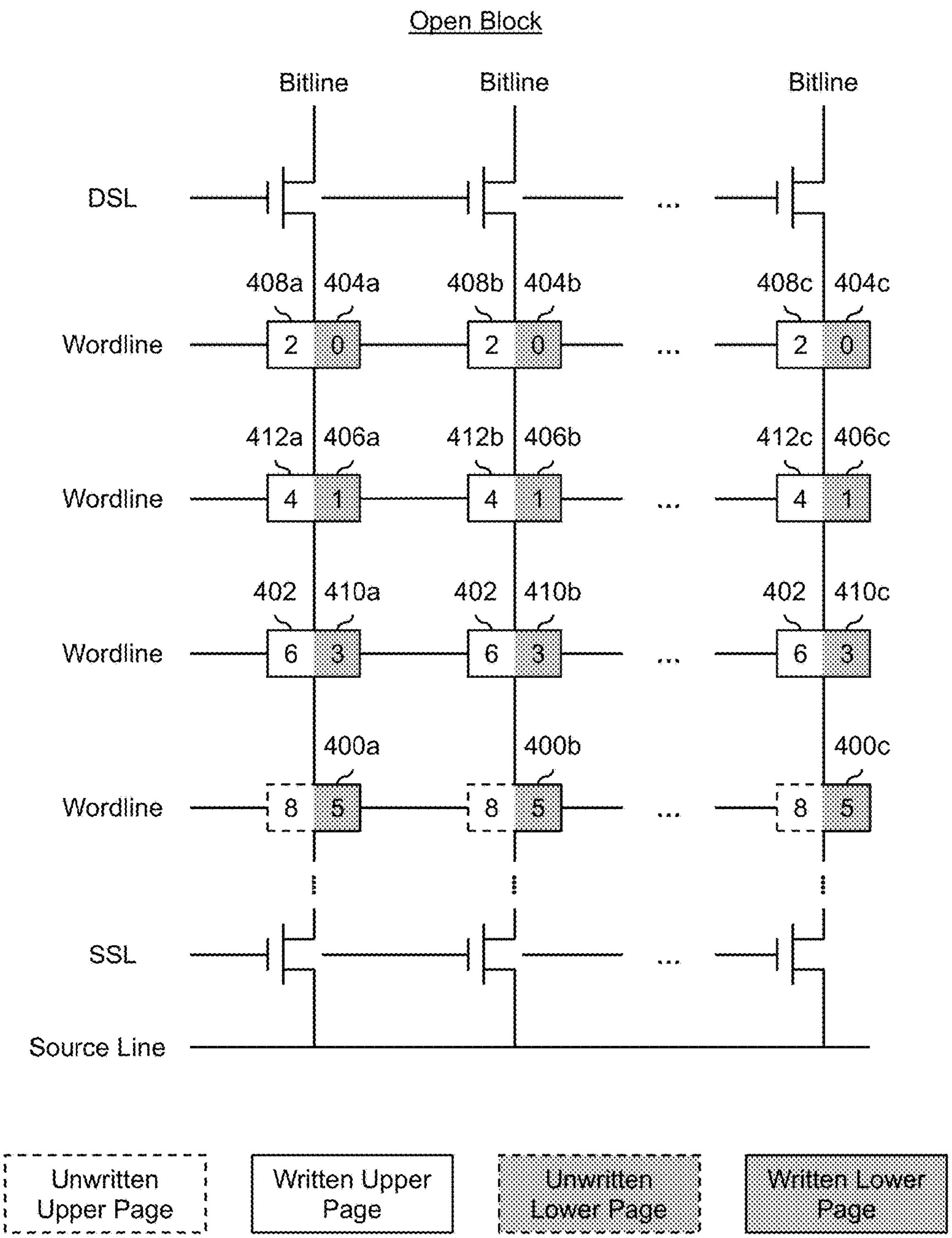
FIG. 4 is a diagram illustrating an embodiment of an open block after an adjacent page is programmed in order to protect a last written page.

FIG. 4 is a diagram illustrating an embodiment of an open block after an adjacent page is programmed in order to protect a last written page. FIG. 4 continues the previous example and shows the open block after page 5 (400*a*-400*c*) and page 6 (402) have been programmed. As described above, programming is done in sequential ascending order in this example. Therefore, in order to program page 6, page 5 is programmed first.

In some embodiments, page 6 is programmed with a PRBS (e.g., the second content which is written at step 102 in FIG. 1 includes a PRBS) because it adds a minimal amount of noise to neighboring pages (e.g., page 1 (404*a*-404*c*), page 3 (410*a*-410*c*), and/or page 4 (412*a*-412*c*)).

In some embodiments, page 5 is programmed with the single parity check (SPC) of all previous programmed pages. For example, the leftmost page 5 (400*a*) is programmed with the exclusive OR (XOR) of the leftmost page 0 (404*a*), leftmost page 1 (406*a*), leftmost page 2 (408*a*), leftmost page 3 (410*a*), and leftmost page 4 (412*a*). Similarly, the second-from-left page 5 (400*b*) is programmed with the exclusive OR (XOR) of the second-from-left page 0 (404*b*), second-from-left page 1 (406*b*), second-from-left page 2 (408*b*), second-from-left page 3 (410*b*), and second-from-left page 4 (412*b*), and so on. In some embodiments, this is attractive because only page 3 is affected by the programming of page 5 (e.g., whereas page 6 in contrast affects programmed pages 1, 3, and 4) and the parity information stored in page 5 may subsequently be useful for error detection and/or error correction. Alternatively, page 5 may be programmed with a PRBS (e.g., because there is already enough parity information and/or the sequence which adds the least amount of noise to neighboring pages is desired).

The following figure shows how distributions (e.g., associated with a PDF) are improved by the process of FIG. 1.

Figure 5:
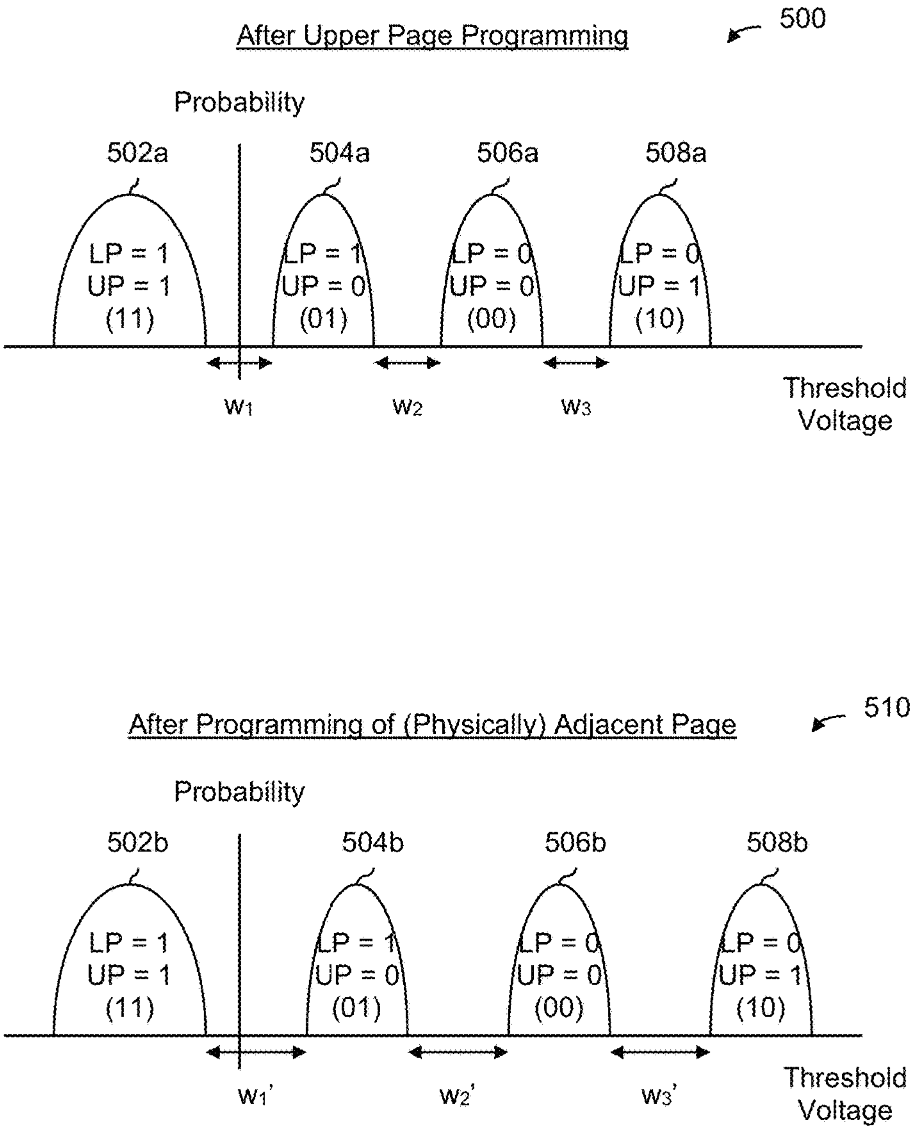
FIG. 5 is a diagram illustrating an embodiment of a PDF where the distributions are spaced further apart after the programming of a physically adjacent page.

FIG. 5 is a diagram illustrating an embodiment of a PDF where the distributions are spaced further apart after the programming of a physically adjacent page. In the example shown, diagram 500 shows the PDF of cells in the last written page (in this case, page 4) after page 4 (e.g., 308 in FIG. 3) has been programmed but before page 5 (e.g., 316 in FIG. 3) and page 6 (e.g., 314 in FIG. 3) have been programmed. In diagram 500, the gap between distribution 502*a* (associated with a 11 value) and distribution 504*a* (associated with a 01 value) is w1, the gap between distribution 504*a* and distribution 506*a* (associated with a 00 value) is w2, and the gap between distribution 506*a* and distribution 508*a* (associated with a 10 value) is w3.

Diagram 510 shows the PDF of the same cells (i.e., page 4) as shown in the state corresponding to FIG. 4 (i.e., after page 5 (400*a*-400*c*) and page 6 (402) in FIG. 4 have been programmed). As a result of programming page 5 and page 6, distribution 502*a* has become distribution 502*b*, distribution 504*a* has become distribution 504*b*, distribution 506*a* has become distribution 506*b*, and distribution 508*a* has become distribution 508*b*. The separation between the distributions has increased so that $w1<w1'$, $w2<w2'$, and $w3<w3'$. To put it another way, writing a PRBS to page 6 (402) per FIG. 4 affects the PDF of page 4 in the manner shown. Writing to an adjacent page per FIG. 1 leads to larger separations between the distributions, which in turn corresponds to fewer read errors and a lower bit error rate.

To illustrate how the process of FIG. 1 might work with other types of NAND flash besides ABL, the following figures describe a shared bitline NAND flash example.

Figure 6:
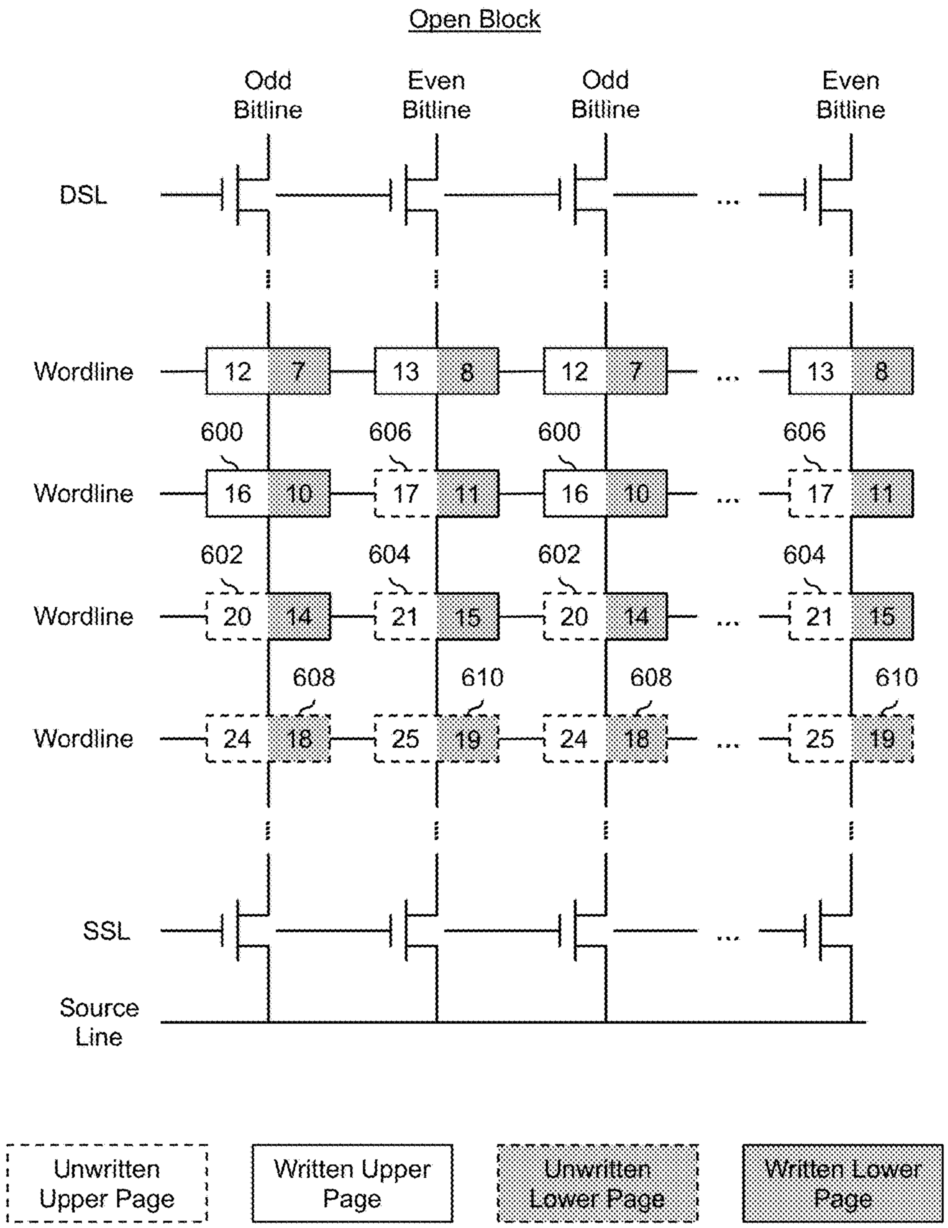
FIG. 6 is a diagram illustrating an embodiment of an open block with a shared bitline.

FIG. 6 is a diagram illustrating an embodiment of an open block with a shared bitline. In this shared bitline architecture, there are even/odd bitlines such that each (physical) wordline has 4 pages instead of 2 pages as is shown in FIG. 3 and FIG. 4. In this example, all pages up to and including page 16 (600) have been written. That is, page 16 would be identified in this example as the last written page in step 100 in FIG. 1.

To protect the last written page (i.e., page 16), page 20 (602) and page 21 (604) should be written. Pages 20 and 21 pages are adjacent pages to page 6 because they are in a wordline which is adjacent to the wordline in which page 6 is located and would be written per step 102 in FIG. 1 (e.g., with a PRBS which would be the least harmful to adjacent pages). As before, the pages are written in sequential numerical order, and so other intervening pages must be written first before page 20 and page 21 can be written. The following figure shows the open block after page 20 and page 21 and all intervening pages (e.g., page 17 (606), page 18 (608), and page 19 (610), which have to be written in order to get to page 20 and 21 per the exemplary sequential writing sequence) have been written.

Figure 7:
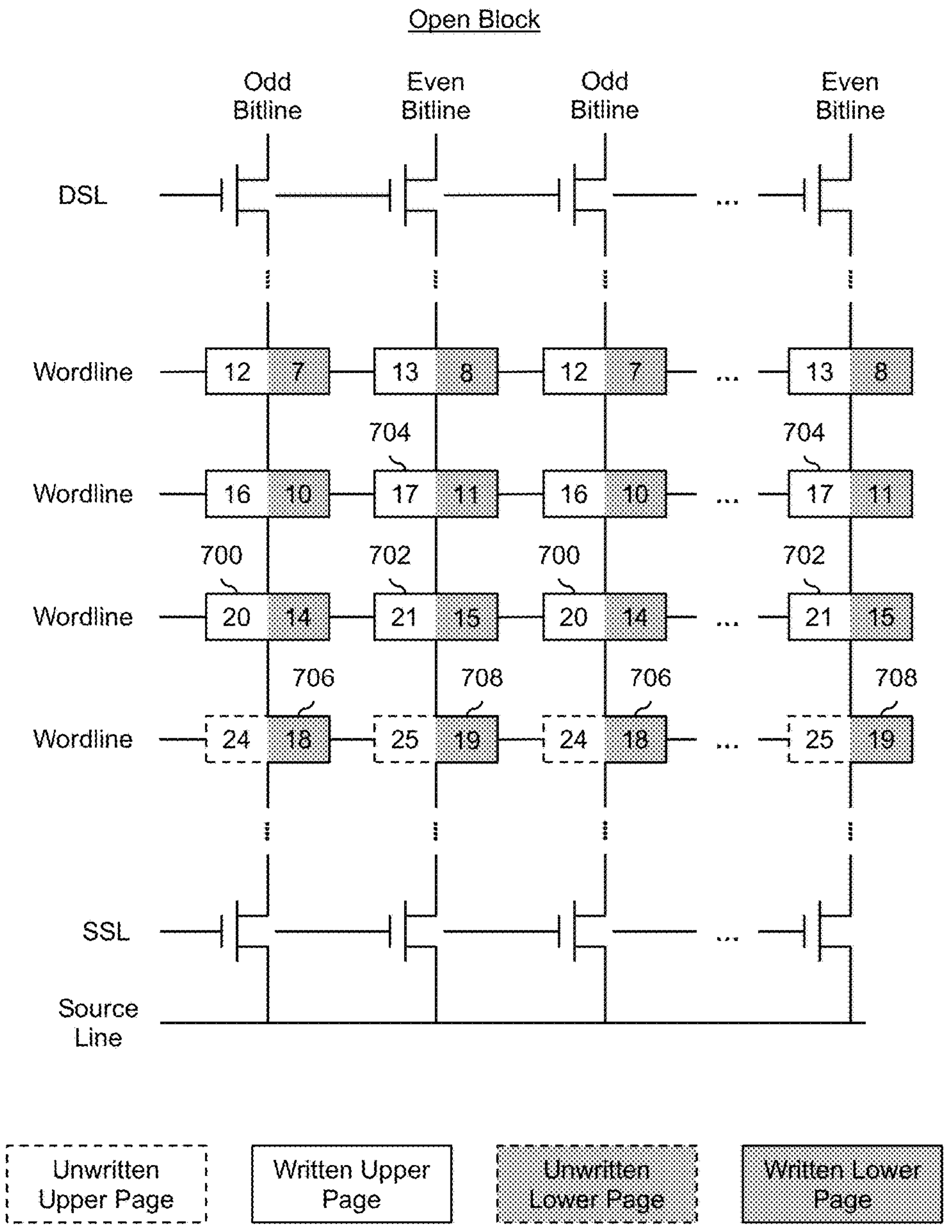
FIG. 7 is a diagram illustrating an embodiment of an open block with a shared bitline after the adjacent pages and intervening pages have been written.

FIG. 7 is a diagram illustrating an embodiment of an open block with a shared bitline after the adjacent pages and intervening pages have been written. As described above, pages 20 (700) and 21 (702) are written so to prevent the introduction of noise into the open block. First, the intervening pages are written: page 17 (704), page 18 (706), and page 19 (708). Then, the adjacent pages (which are physically adjacent to the last written page) are written: page 20 and page 21.

In some embodiments, the first intervening page (i.e., page 17) is written with the SPC sequence for all previously written pages and the other intervening pages (i.e., pages 18 and 19) and the adjacent pages (i.e., pages 20 and 21) are written with a PRBS.

Returning to FIG. 1, in some embodiments, step 102 is only performed when some criteria is met. For example, this may keep the amount of overhead information written to the NAND flash storage down. The following figures describe some examples of such criteria.

Figure 8:
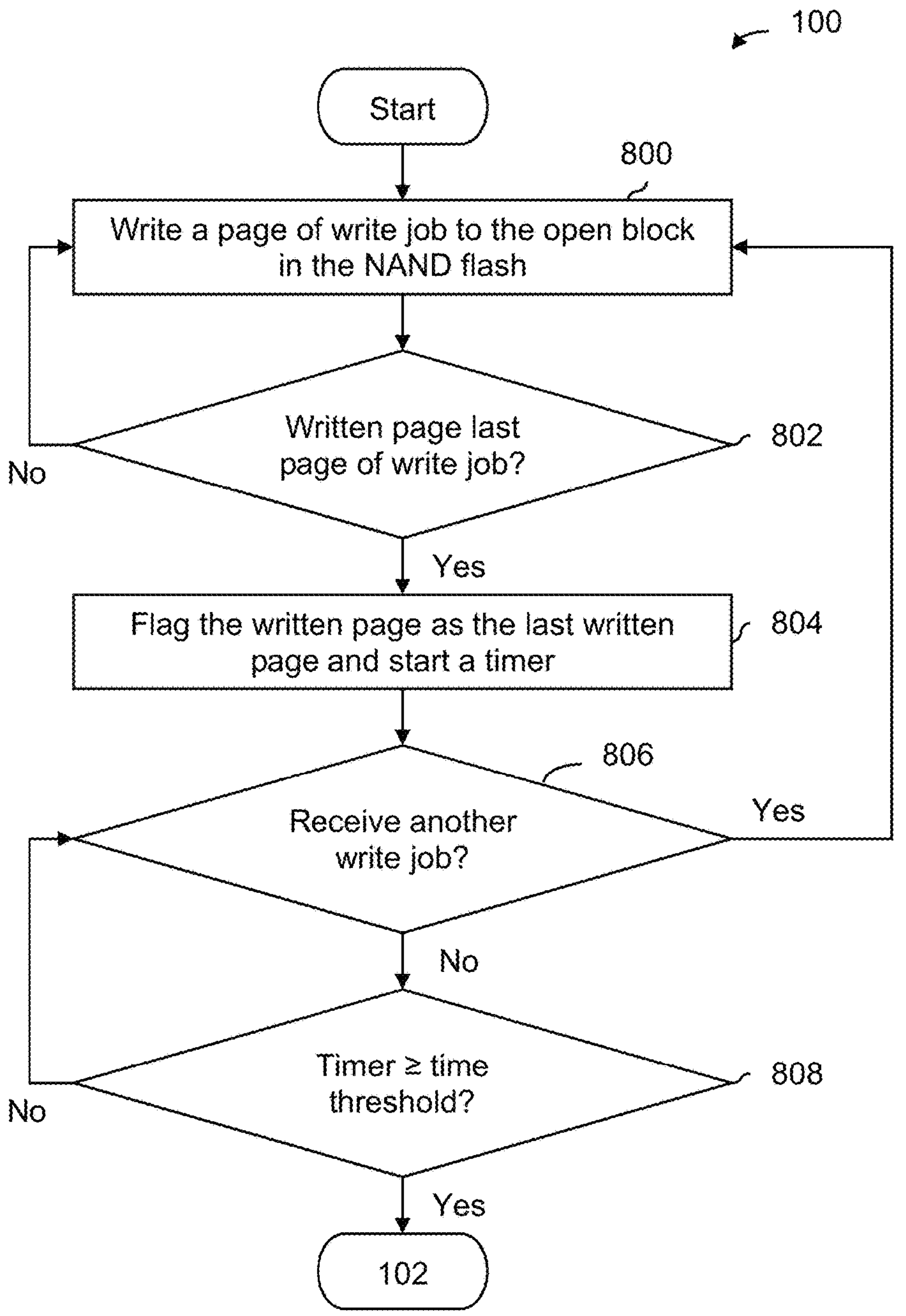
FIG. 8 is a diagram illustrating an embodiment of a process to determine whether to write to an adjacent page using a time threshold.

FIG. 8 is a diagram illustrating an embodiment of a process to determine whether to write to an adjacent page using a time threshold. In some embodiments, step 100 in FIG. 1 includes the process shown. In some embodiments, the process is performed by a NAND flash controller.

At 800, a page of a write job is written to the open block in the NAND flash. As described above, write jobs may be received from some upper level entity (e.g., a host or an application) and the write job includes or is associated with one or more pages of data to be written to the NAND flash storage.

At 802, it is determined if the written page (e.g., the one written at step 800) is the last page of the write job. If not, step 800 is repeated and the next page of the write job is written. For simplicity and brevity, the process of FIG. 8 assumes that the open block does not fill up during the process of FIG. 8. Naturally, if the open block filled up, the completed block would be closed and a new and empty block would be opened for data to be written to.

If it is determined at 802 that the written page is the last page of the write job, the written page is flagged as the last written page and a timer is started at 804. For example, the timer may start at 0 and count upwards.

At 806, it is determined if another write job is received. If so, one page of the new write job is written at 800. Once the last page of the new write job is reached at 802, the last written page is updated (e.g., in response to the new write job) and the timer is restarted (e.g., again in response to the new write job) at 804.

If it is determined at 806 that another write job has not been received, then at 808 it is determined if the timer is greater than a time threshold. For example, the time threshold may be set to 30 minutes. If it is determined at 808 the timer is greater than the time threshold, step 102 in FIG. 1 is performed. Otherwise, the process checks to see if another write job has been received at step 806. In other words, an adjacent page will be written at step 102 in FIG. 1 only if the time threshold is exceeded. This may mitigate the amount of overhead information (e.g., a PRBS and a SPC sequence) written to the open block.

For simplicity and ease of explanation, this example and the following example use a timer (e.g., which is reset every time there is a new write job/last write page) which is compared against a timer threshold. Naturally, any technique for tracking the passage of time may be used.

In some embodiments, more stringent criteria may be desired to further reduce the amount of overhead information written to the open block. The following figure describes an example in which a timer threshold and error correction decoding results are used.

Figure 9:
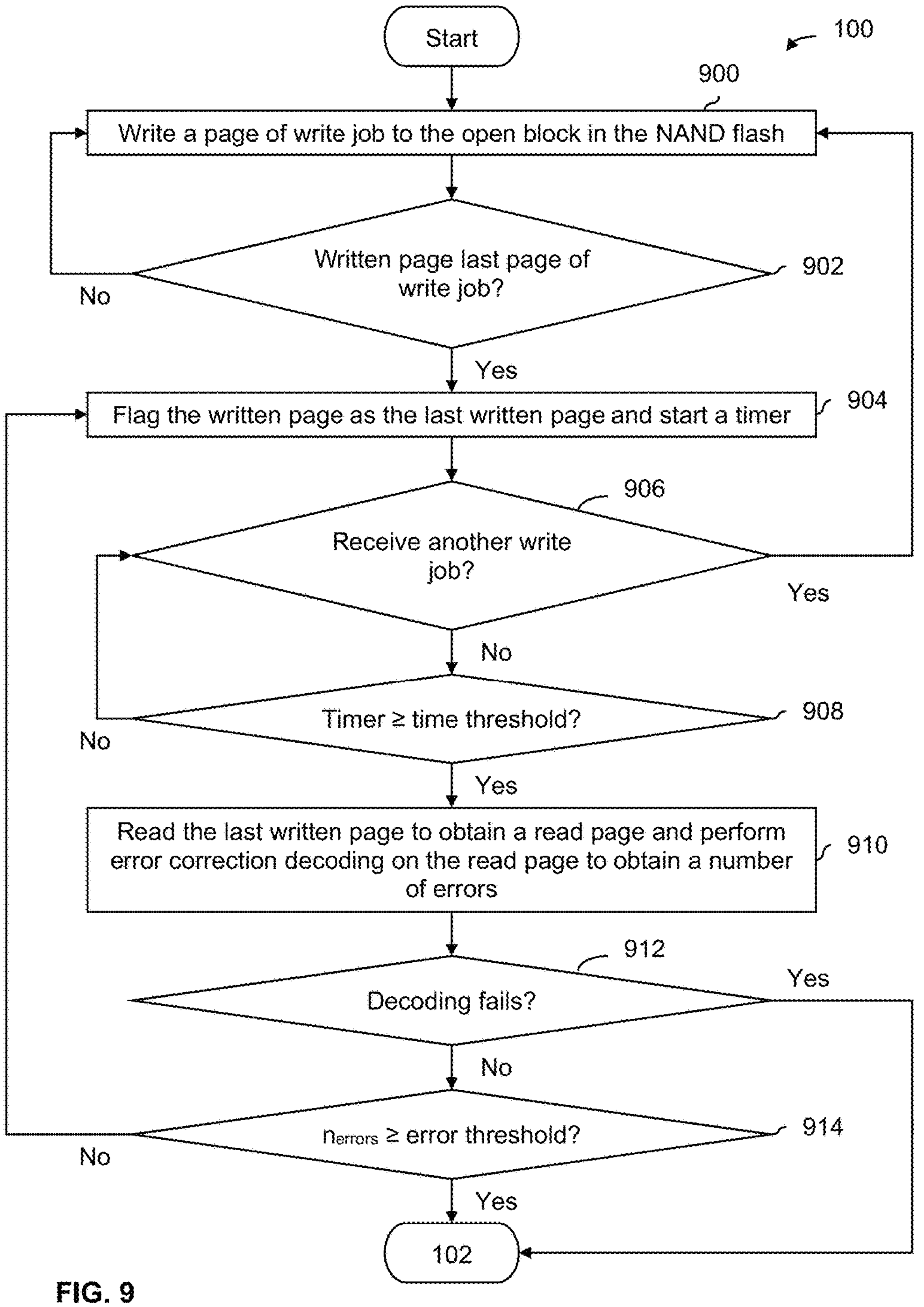
FIG. 9 is a diagram illustrating an embodiment of a process to determine whether to write to an adjacent page using a time threshold and error correction decoding results.

FIG. 9 is a diagram illustrating an embodiment of a process to determine whether to write to an adjacent page using a time threshold and error correction decoding results. In some embodiments, step 100 in FIG. 1 includes the process shown. In some embodiments, the process is performed by a NAND flash controller.

At 900, a page of a write job is written to the open block in the NAND flash. At 902, it is determined if the written page is the last page of the write job. If so, the written page is flagged as the last written page and a timer is started at 904. If not, the next page of the write job is written at step 900.

After recording the last written page and starting the timer at step 904, it is determined at 906 if another write job has been received. If so, one page of the new write job is written at step 900 and the last written page is updated and the timer is restarted at step 904.

If it is determined at step 906 that another write job has not been received, it is determined at 908 if the timer is greater than a time threshold. As described above, in one example, the time threshold is set to 30 minutes. If it is determined at 908 that the timer is less than the time threshold, the process checks to see if another write job has been received at step 906.

If it is determined at 908 that the timer is greater than or equal to the time threshold, the last written page is read to obtain a read page and error correction decoding is performed on the read page to obtain a number of errors ($n_{errors}$) at 910. In this example, the data (e.g., from the various write jobs) is error correction encoded before it is stored on the NAND flash storage. For example, it may arrive already error correction encoded (e.g., by a host or an application), or the NAND flash controller may error correction encode the data before storing it. It is noted that the number of errors is only relevant or known if error correction decoding is successful. That is, if error correction decoding is unsuccessful, the exact number of errors in the read data is unknown.

At 912, it is determined if the error correction decoding is successful. For example, error correction codes have some maximum number of errors which they are able to correct; this is sometimes referred to as the error correction capability of the code. If the number of errors in the read data is greater than the error correction capability of the code, the error correction code is unable to "fix" the read data and a decoding failure is declared.

If it is determined at step 912 that the error correction decoding has failed (e.g., because the number of errors contained in the read data is beyond the error correction capability of the code used), step 102 in FIG. 1 is performed. In other words, too much time has elapsed since the last write and the last written page has deteriorated so much that the error correction code fails. This is a bad scenario, and so the adjacent page is written (e.g., at step 102 in FIG. 1). As will be described more formally below, in some embodiments, a last written page is re-written with recovered data when a time threshold has been exceeded and error correction decoding fails.

If it is determined at step 912 that the error correction decoding is successful (i.e., it did not fail), it is determined at step 914 if the number of errors (e.g., obtained at step 910) is greater than an error threshold. For example, if the read data (e.g., at step 910) has errors, but the number of errors is less than the error correction capability of the code, the error correction code is able to correct the read data and the number of corrections is the number of errors. For example, for binary read data, the number of errors is the number of incorrect 1s corrected to 1, plus the number of incorrect 1s corrected to 0; $0 \leq$ the number of errors ($n_{errors}$) $\leq$ the error correction capability of the code.

If it is determined at step 914 that the number of errors is less than the error threshold, the timer is restarted at step 904 (e.g., where the last written page remains the same).

If it is determined at step 914 that the number of errors is greater than or equal to the error threshold, step 102 in FIG. 1 is performed. In some embodiments, in addition to performing step 102, the last written page is re-written (e.g., because even though the error correction decoding did not fail, the fact that the number of errors contained in the read data surpassed the error threshold is enough of a concern to warrant re-writing the last written page, which would ideally cause the (threshold) voltages stored therein to be reprogrammed to more ideal or perfect values).

The following figures more formally describe some specific examples previously described above of how step 102 in FIG. 1 may be performed.

Figure 10:
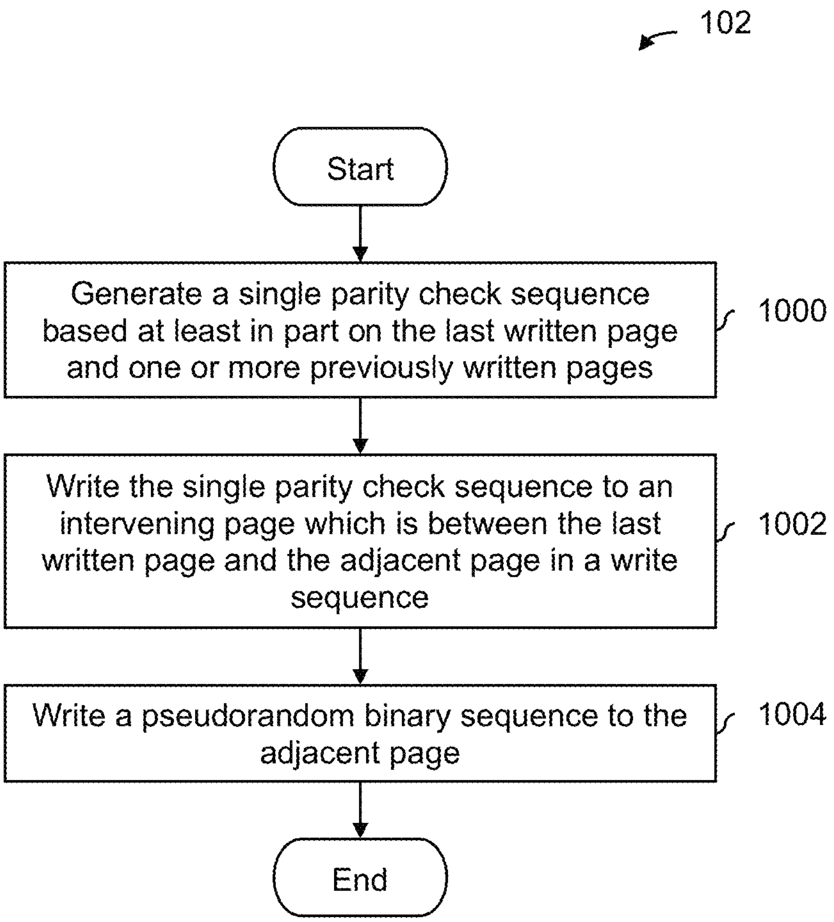
FIG. 10 is a flowchart illustrating an embodiment of a process to write second content to an adjacent page.

FIG. 10 is a flowchart illustrating an embodiment of a process to write second content to an adjacent page. In some embodiments, the example process is used at step 102 in FIG. 1. In some embodiments, the process is performed by a NAND flash controller.

At 1000, a single parity check sequence is generated based at least in part on the last written page and one or more previously written pages. In FIGS. 3 and 4, for example, page 4 was the last written page and the SPC in that example is the (e.g., bit-wise) XOR of pages 0-4. In the example of FIGS. 6 and 7, page 16 was the last written page. In that example, the SPC is generated by XORing pages 0-16.

At 1002, the single parity check sequence is written to an intervening page which is between the last written page and the adjacent page in a write sequence. For example, in FIG. 4, the SPC is written to page 5 and in FIG. 7, the SPC is written to page 17.

At 1004, a pseudorandom binary sequence is written to the adjacent page. For example, in FIG. 4, a PRB S is written to page 6 (which is physically adjacent to the last written page) and in FIG. 7, a PRBS is written to pages 20 and 21 (which are physically adjacent to the last written page). In addition, in the example of FIG. 7, pages 18 and 19 are also written with a PRBS.

As described above, in some cases it is desirable to rewrite the last written page. The following figure describes an example process where the last written page is (re)written in addition to an intervening page and the adjacent page.

Figure 11:
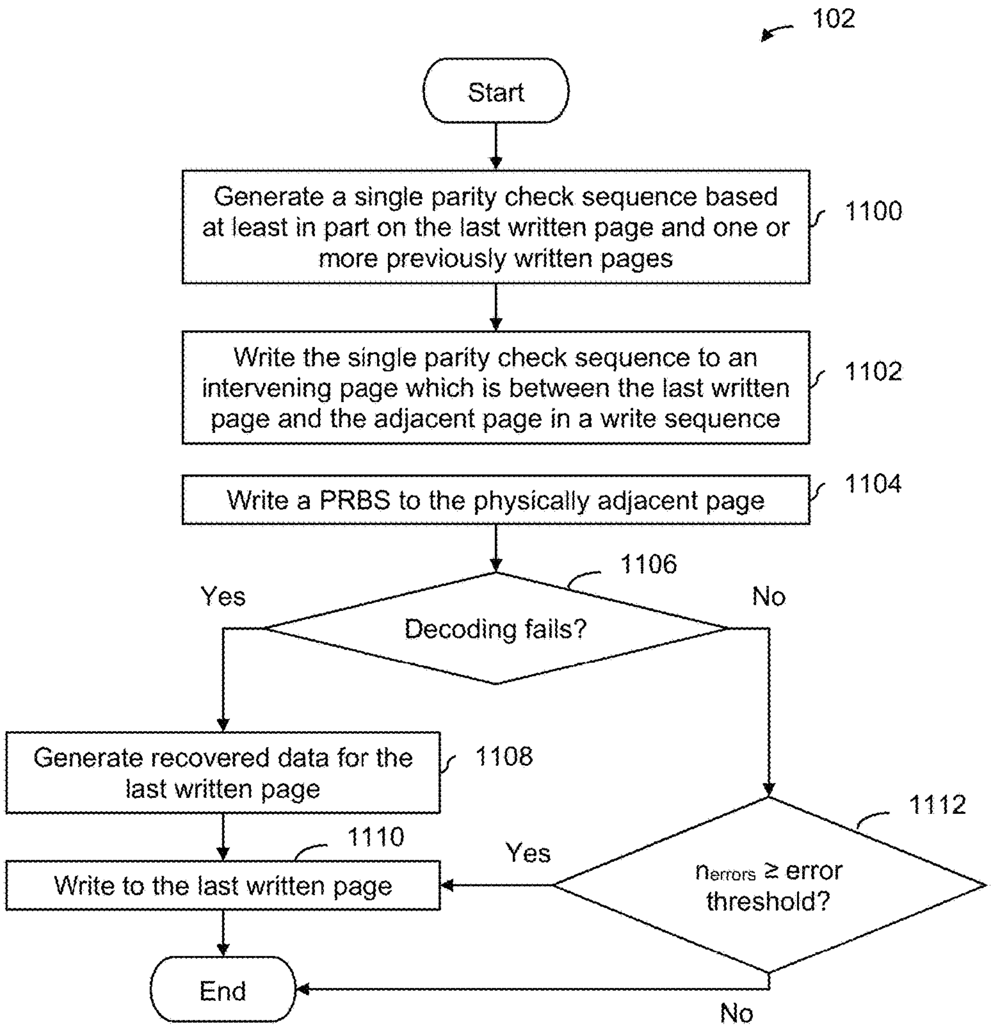
FIG. 11 is a flowchart illustrating an embodiment of a process to write second content to an adjacent page, including by rewriting the last written page.

FIG. 11 is a flowchart illustrating an embodiment of a process to write second content to an adjacent page, including by rewriting the last written page. In some embodiment, the example process is used at step 102 in FIG. 1. In some embodiments, the process of FIG. 11 is performed together with the process of FIG. 9. For example, the results of the error correction decoding performed at step 910 in FIG. 9 may be used at step 1106 and/or step 1112.

At 1100, a single parity check sequence is generated based at least in part on the last written page and one or more previously written pages. At 1102, the single parity check sequence is written to an intervening page which is between the last written page and the adjacent page in a write sequence. At 1104, a pseudo-random binary sequence is written to the physically adjacent page.

At 1106, it is determined if error correction decoding has failed. For example, the last written page may be read and error correction decoding may be performed on the read data. If the read data has too many errors (e.g., more errors than the error correction capability of the code), then the decoding process will fail.

If it is determined at 1106 that error correction decoding has failed, then at 1108, recovered data is generated for the last written page (e.g., using RAID or some other data recovery technique). For example, redundant information is spread out over multiple physical and/or logical devices and the appropriate RAID recovery technique is used to recover the data which was stored in the last written page. The last written page is then written (e.g., with the recovered data from step 1108) at 1110.

If it is determined at 1106 that error correction decoding is successful, at 1112 it is determined if the number of errors is greater than an error threshold. As described above, if error correction decoding is successful, the decoder will know how many errors were contained in the read data which was decoded.

If it is determined at 1112 that the number of errors is greater than or equal to the error threshold, then the last written page is written at step 1110 (e.g., with the error corrected data which is output by the error correction decoder). For example, even though there were not enough errors in the last written page to cause the error correction code to fail, it is still high enough to be a concern and so the page is rewritten to remove noise (e.g., in the form of extra charge, unintentionally added). Rewriting recovered (e.g., via RAID) or corrected (e.g., using an error correction code) data to the last written page at step 1110 will cause the threshold voltage levels of the last written page to be reprogrammed to values that are closer to some ideal or perfect value, reducing the amount of noise in the last written page.

If, however, it is determined at 1112 that the number of errors is less than the error threshold, the process ends (e.g., without (re)writing the last written page at step 1110). For example, the last written page only had a few errors, so it is not necessary at this time to rewrite that page.

In some embodiments, there are multiple blocks open at the same time. The following figure describes one such example.

Figure 12:
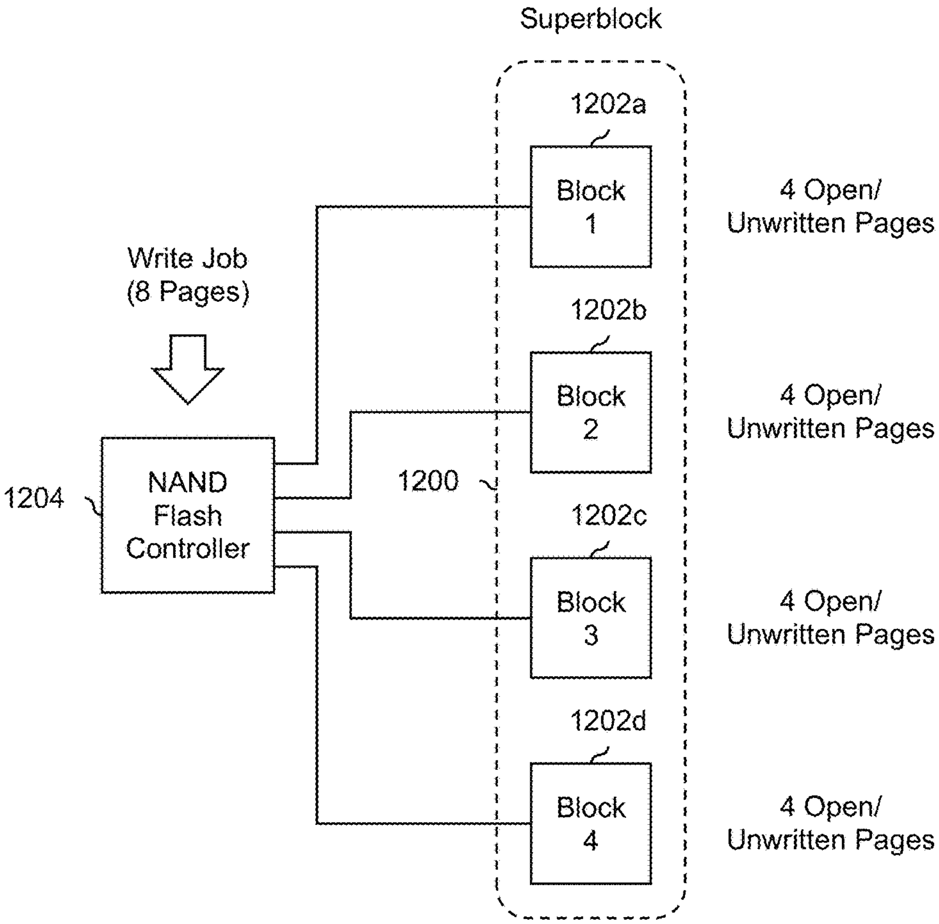
FIG. 12 is a diagram illustrating an embodiment of a superblock with 4 blocks.

FIG. 12 is a diagram illustrating an embodiment of a superblock with 4 blocks. It is noted that although the exemplary superblock shown here is made up of 4 blocks, the techniques described herein apply to any number of blocks per superblock.

One drawback of NAND flash storage is that programming time is relatively slow. To overcome this, some NAND flash systems (such as the exemplary system shown here) use superblocks which are made up of multiple blocks. In this example, superblock 1200 is made up of blocks 1202*a*-1202*d*. Each of blocks 1202*a*-1202*d* has its own channel or connection to the NAND flash controller (1204). This permits the blocks to be programming in parallel, which speeds up the total or overall programming time.

In the state shown, each of blocks 1202*a*-1202*d* has 4 open or unwritten blocks. A write job arrives at NAND flash controller 1204 which includes 8 pages of write data. Normally, to make programming as fast as possible, the NAND flash controller divides up a write job equally amongst all blocks in a superblock. So, normally 2 pages would be written to the first block (1202*a*), 2 pages would be written to the second block (1202*b*), and so on. This would leave all 4 blocks open, with 2 open (unwritten) pages per block.

However, if the next write job (not shown here) took a long time to arrive, this would leave all 4 blocks vulnerable to noise (as described above). If, however, the NAND flash controller instead wrote 4 pages to the first block (1202*a*) and 4 pages to the second block (1202*b*), then those blocks would be closed and would no longer be vulnerable, reducing the number of vulnerable (open) blocks from 4 to 2. Since only 2 blocks are vulnerable (open), at most 2 blocks will have overhead information written to them (e.g., per the process of FIG. 1 and/or in the form of a PRBS and/or a SPC sequence). Therefore, in some embodiments, a NAND flash controller prioritizes the closure of almost full block(s) over the equitable distribution of write data. The following figure describes this process more formally.

Figure 13:
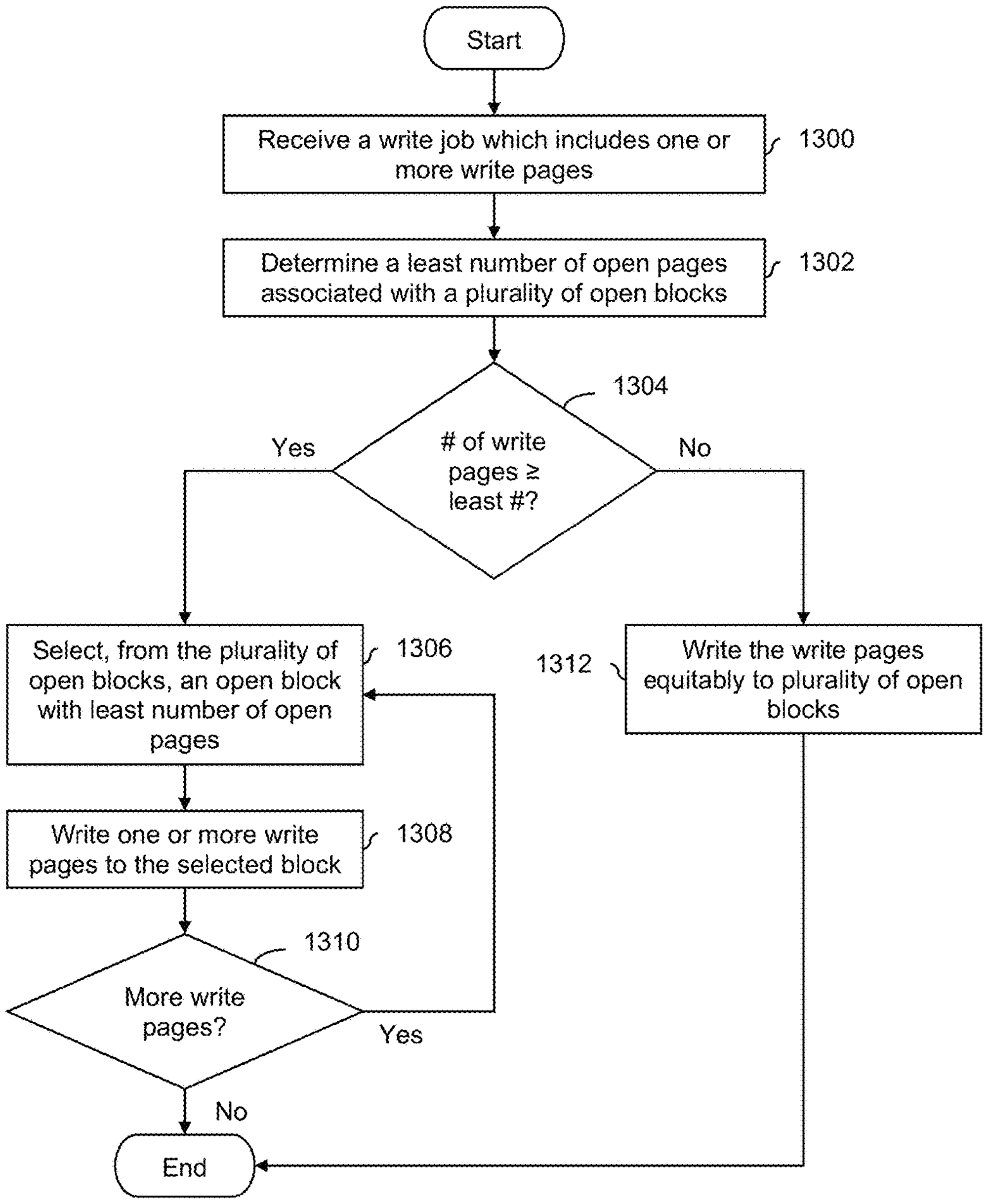
FIG. 13 is a flowchart illustrating a process to select open blocks from a plurality of open blocks when a write job is received.

FIG. 13 is a flowchart illustrating a process to select open blocks from a plurality of open blocks when a write job is received. At 1300, a write job which includes one or more write pages is received. In the example of FIG. 12, the write job includes 8 pages of write data. Naturally, a write job may include any amount of write data.

At 1302, a least number of open pages associated with a plurality of open blocks is determined. In FIG. 12, for example, there are 4 open blocks, each with 4 open/unwritten pages. In that example, step 1302 would select the lowest number of open pages: min{4, 4, 4, 4}=4. To put it another way, step 1302 determines what is the least number of pages required to close any block in the plurality of open blocks. Suppose there are instead 2 blocks: one with 4 open pages and one with 8 open pages. In that example, the number determined at 1302 would be 4 (i.e., min {4, 8}).

At 1304, it is determined if the number of write pages is greater than or equal to the least number of open pages. In the example of FIG. 12, this would consist of comparing 8 (i.e., the number of write pages) against 4 (i.e., the least number of open pages). In other words, does the write job have enough data to close the open block with the least number of open pages?

If so, an open block with a least number of open pages is selected from the plurality of open blocks at 1306. For example, if there are 2 open blocks with 4 open pages and 8 open pages, then the open block with 4 open pages would be selected at 1306. For simplicity and brevity, it is assumed at step 1306 that there will always be open blocks. If needed, a NAND flash controller may wait until an open block becomes available. At 1308, one or more write pages are written to the selected block.

At 1310, it is determined if there are more write pages. For example, suppose that the write job had 10 pages and 4 pages were written to the first selected block (now closed). There are still 6 pages left in the write job and additional open block(s) must be selected. If it is determined at 1310 that there are more pages in the write job, the open block with the next least number of open pages is selected at 1306. Selecting open blocks in this manner (in ascending order, based on number of open pages) maximizes the number of open blocks which are closed. This, in turn, is desirable, because less overhead information is written to the system as a whole (e.g., because there are fewer open/vulnerable blocks which would be written to with overhead information per the process of FIG. 1). If it is determined at 1310 that there are no more write pages, the process ends. Naturally, the process may be repeated the next time a write job is received.

If it is determined at step 1304 that the number of write pages does not exceed the least number of open pages, then the write pages are written equitably to the plurality of open blocks at 1312. In other words, the write job does not have enough write data to close even one open block (e.g., even if all of the write data were written to the open block with the least number of open pages). As such, the write job is written in some default manner, in this example, in an equitable manner (e.g., divided up equally amongst all of the plurality of open blocks). Step 1312 is shown for completeness and any default technique for selecting open blocks or assigning write data to open blocks may be used.

For ease of explanation, writing to one block (e.g., at step 1308, iteration i) occurs before selection of the next block (e.g., at step 1306, iteration i+1) and writing to that block (e.g., at step 1308, iteration i+1). In real-world applications, blocks may be written in parallel to improve performance. That is, it is not necessary for one block to finish writing before another block is written to.

The previous examples described above relate to one specific part of the lifecycle of a block, specifically when an open block is written. The following figures describe some processes which may be used in combination with the process of FIG. 1 to further help with noise prevention. It is noted that while the process of FIG. 1 is associated with writing to an open block, the following exemplary processes relate to other parts of a block's lifecycle.

Figure 14:
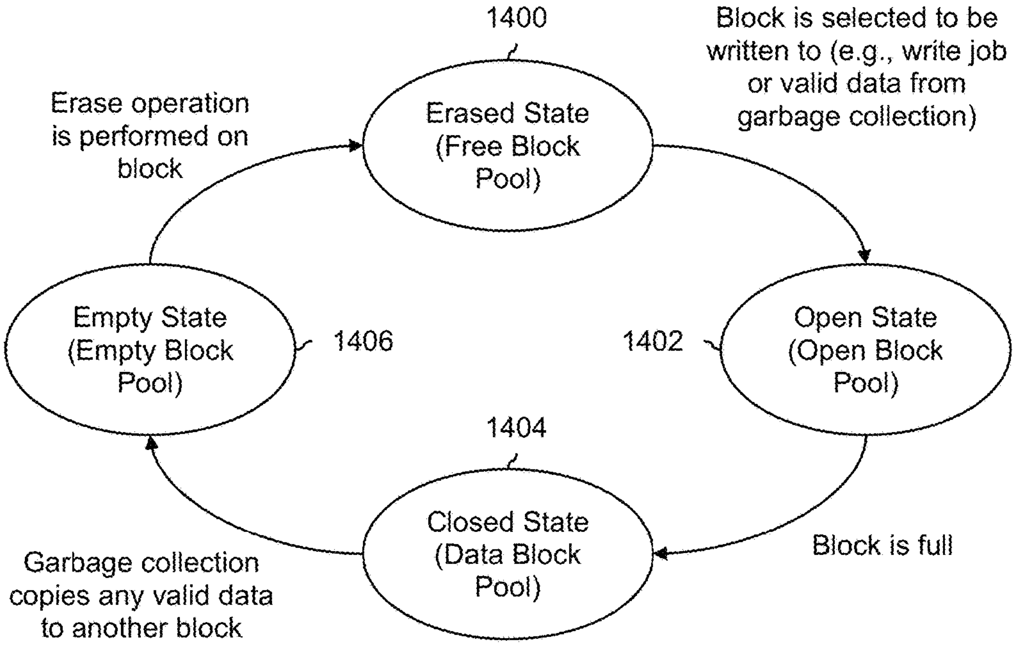
FIG. 14 is a diagram illustrating an embodiment of state machines associated with the lifecycle of a block.

FIG. 14 is a diagram illustrating an embodiment of state machines associated with the lifecycle of a block. In the example shown, states 1400, 1402, 1404, and 1406 show the states that a block progresses through. Blocks start out in an erased state (1400) and blocks that are in this state are sometimes referred to as being in a free block pool. To get into this state, an erase operation is performed on the block (e.g., where all of the various charge levels or threshold voltages stored by the cells in the block are discharged).

The block stays in the free block pool until it is selected to be written to, for example with write data from a write job, or with valid data which is being moved or copied out of another block which is being garbage collected (this is described in more detail below). The selected block is "opened" (e.g., conceptually) and blocks in this state are in the open state (1402). So long as the block has open pages available to be written to, the block will stay in the open state (i.e., open block pool).

Once the block becomes full, it enters the closed state (1404). Blocks in this state are sometimes referred to as being a data block pool. Over time, some of the pages in the blocks become invalid or out of date. For example, an upper level entity such as a host or an application may send a trim command to the NAND flash controller which indicates that one or more specified page(s) are invalid. The NAND flash controller keeps track of which pages are valid and which pages are invalid using a bitmap for each block in the data block pool.

To enter the empty state (1406), a closed block in the data block pool is selected by a garbage collection process. In some embodiments, a closed block is selected by a garbage collection process once the number or percentage of valid data reaches some threshold. In some other embodiments, the NAND flash storage is getting full and so the garbage collection process picks the closed block with the fewest number of valid pages. In any case, once a block is selected, the garbage collection process copies any remaining valid data from the block to some other block using the corresponding bitmap. Going back to state 1400, in some embodiments, an erased block from the free block pool may be selected for the valid data to be copied into. In some other embodiments, an already-open block in the open block pool (1402) is written to. In any case, the valid data is copied out and the block is now empty. It is noted that blocks in the empty state/pool are not erased. That is, the cells of blocks in the empty state still hold some charge.

To enter the erased state (1400), an erase operation is performed on the empty block, causing the block to discharge any stored threshold voltage. Some other (garbage collection) processes may erase a block immediately after the valid data is copied out of the block being garbage collected. Such techniques would not, for example, have empty state 1406 since blocks would not linger in that state. However, for newer NAND flash with smaller geometries (e.g., 15 nm), erased blocks which sit around for a long time without being programmed are susceptible to noise. For this reason, in this example, only some blocks are in the erased state and they are replaced on an as-needed basis (e.g., as erased blocks get opened and written to). To put it another way, empty blocks are not immediately erased on an automatic basis.

In this example, the number of erased blocks in the free block pool is based upon the largest possible write job and the amount of time required to erase an empty block (e.g., because erasing takes a non-negligible amount of time). In other words, the NAND flash controller should have enough blocks in the free block pool at all times to satisfy the worst case scenario write job without running out of erased blocks to write to. For example, if it takes longer to erase blocks, then a larger supply of erased blocks will need to be maintained in the free block pool in order to mask or cover the longer erase time. If the number of erased blocks in the free block pool goes below this minimum or threshold, empty blocks are erased until the minimum number is reached. The following figure describes this process for erasing empty blocks.

Figure 15:
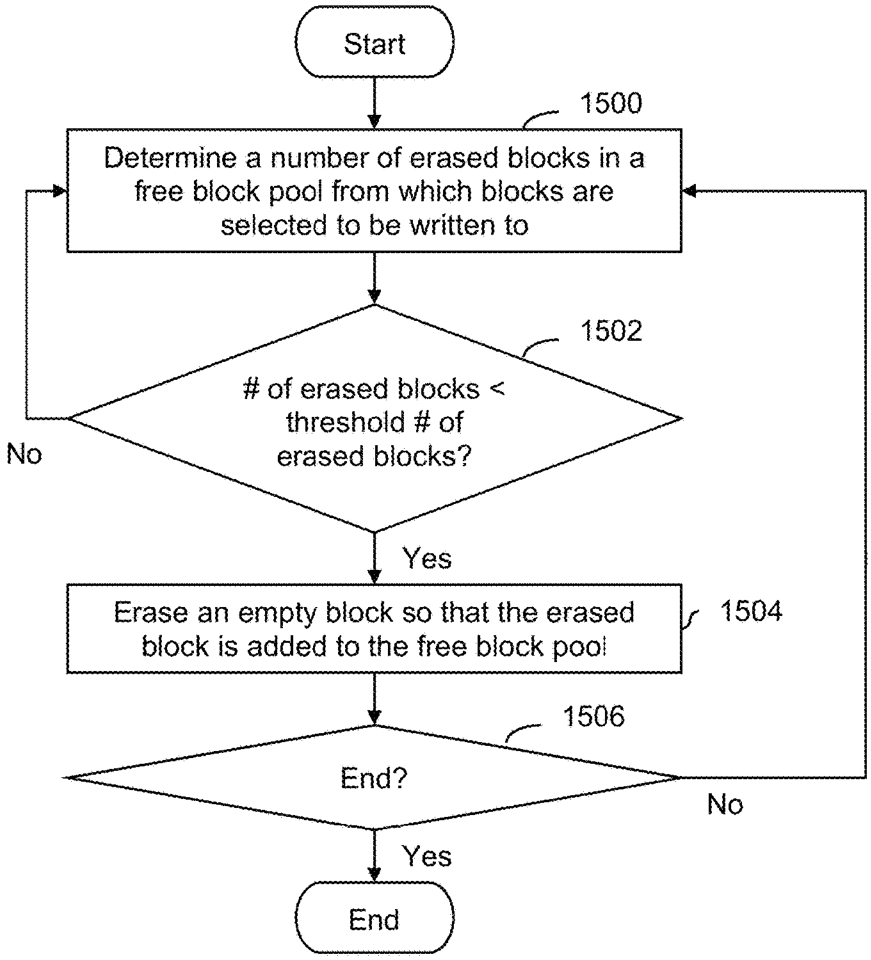
FIG. 15 is a diagram illustrating an embodiment of a process to maintain a minimum number of erased blocks.

FIG. 15 is a diagram illustrating an embodiment of a process to maintain a minimum number of erased blocks. As described above, maintaining only some threshold number of erased blocks (e.g., as opposed to immediately erasing a block after copying off any remaining valid data) reduces the amount of noise introduced into the system. In some embodiments, the process of FIG. 15 is performed in combination with the process of FIG. 1 to reduce noise.

At 1500, a number of erased blocks in a free block pool from which blocks are selected to be written to is determined. For example, a NAND flash controller may keep track of how many erased blocks are in the free block pool. As described above, if a NAND flash controller needs a new block to write to, the number of erased blocks will be decremented by one (see, e.g., erased state 1400→open state 1402 in FIG. 14). If an empty block is erased, then the number of erased blocks will be incremented by one (see, e.g., empty state 1406→erased state 1400 in FIG. 14).

At 1502, it is determined if the number of erased blocks is less than a threshold number of erased blocks. As described above, the threshold number of erased blocks may depend upon the maximum size of a write job and/or the amount of time required to erase a block. That is, the threshold number of erased blocks may be selected so that a NAND flash controller will never run out of erased blocks, even if it receives the largest possible write job.

If it is determined at 1502 that the number of erased blocks is greater than or equal to the threshold number of erased blocks, then the number of erased blocks is determined again at 1500 (e.g., to see if it has changed).

Otherwise, an empty block is erased so that the erased block is added to the free block pool at 1504. This causes the number of erased blocks to be incremented so that the number of erased blocks equals the threshold number (or is at least closer to the threshold).

At 1506, it is determined whether to end the process. For example, the process may end if the NAND flash is shut down or enters some sleep/low power state. If it is determined at 1506 to not end the process, then the (new) number of erased blocks is determined at 1500. If needed, the process will continue to erase more empty blocks until the minimum number is reached.

Returning to the state machines shown in FIG. 14, the system needs to know which pages are valid/invalid so that blocks in the data block pool (1404) can be selected to be emptied and/or the appropriate data can be copied off the block which is being emptied. The following figure shows exemplary bitmaps which are generated while an open block is being written to (e.g., per the process of FIG. 1).

Figure 16:
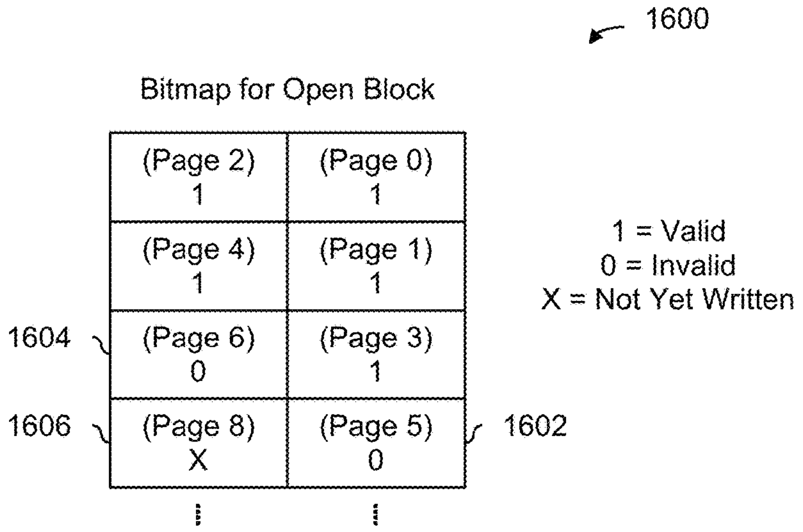
FIG. 16 is a diagram illustrating some embodiments of a bitmap.
Figure 16:
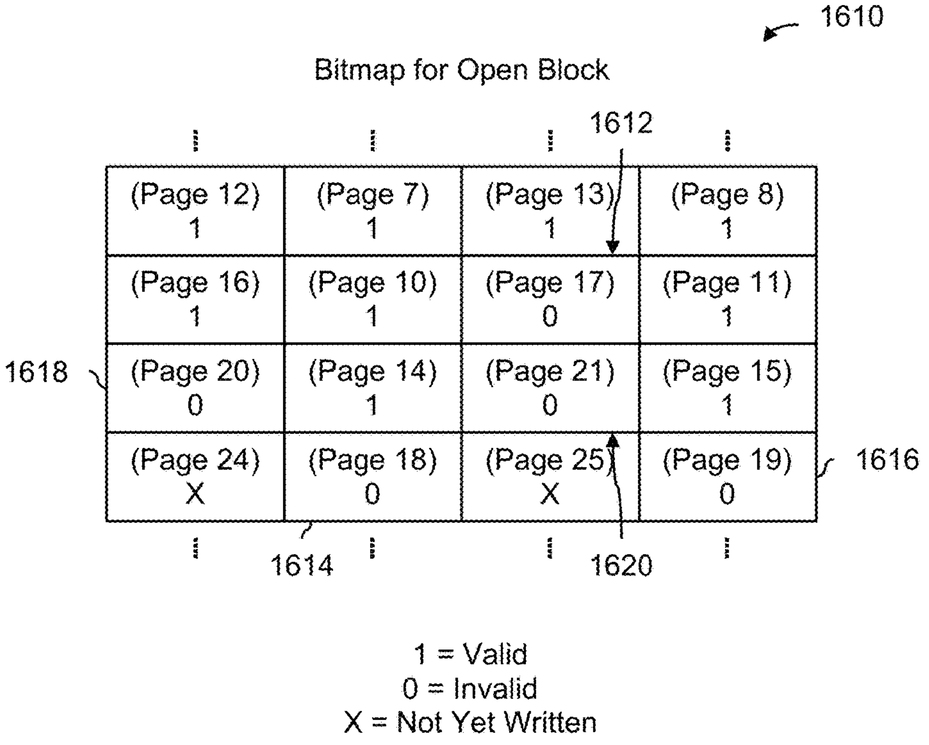

FIG. 16 is a diagram illustrating some embodiments of a bitmap. In the example shown, each entry in the bitmap corresponds to a page; there may be other bitmaps for other pages. In this example, bitmap 1600 corresponds to the example of FIGS. 3 and 4. In this example, pages which are written with data from the write job are marked with a 1 for valid data. Page 5 (1602), which was written with an SPC sequence, and page 6 (1604), which was written with a PRBS, are marked with a 0 for invalid data, because those pages are overhead information and do not include data from the write job. Page 8 (1606) has not yet been written (at least in the state shown in FIG. 4) and so page 8 is marked with an X.

Similarly, bitmap 1610 corresponds to the example of FIGS. 6 and 7. The pages which were written with overhead information (i.e., page 17 (1612), page 18 (1614), page 19 (1616), page 20 (1618), and page 21 (1620)) are marked with a 0.

In FIG. 14, once the open block pool (1402) is completely written to, the bitmap will be filled with only 0s and 1s, no Xs. In the closed state (1404), the NAND flash controller will update the bitmap as pages become invalid or otherwise out-of-date. For example, a host or application may send a trim command to a NAND flash controller and (in response) the NAND flash controller may change the indicated pages from 1 (i.e., valid) to 0 (i.e., invalid).

In closed state 1404, the NAND flash controller and/or garbage collection process may also use the bitmap to select a next block to empty. For example, some selection techniques may select the block with the fewest number/percentage of valid pages. Or, some other selection techniques decide to empty a block once the number/percentage of valid pages reaches some threshold.

Once selected for emptying (e.g., closed state 1404→empty state 1406), the bitmap is used to copy off the remaining valid data. Once the valid data is copied off, the bitmap may (if desired) be erased. The cycle then repeats when the block is written to in the open state (1402).

The following figure more formally describes this exemplary process for generating a bitmap when an open block is being written to.

Figure 17:
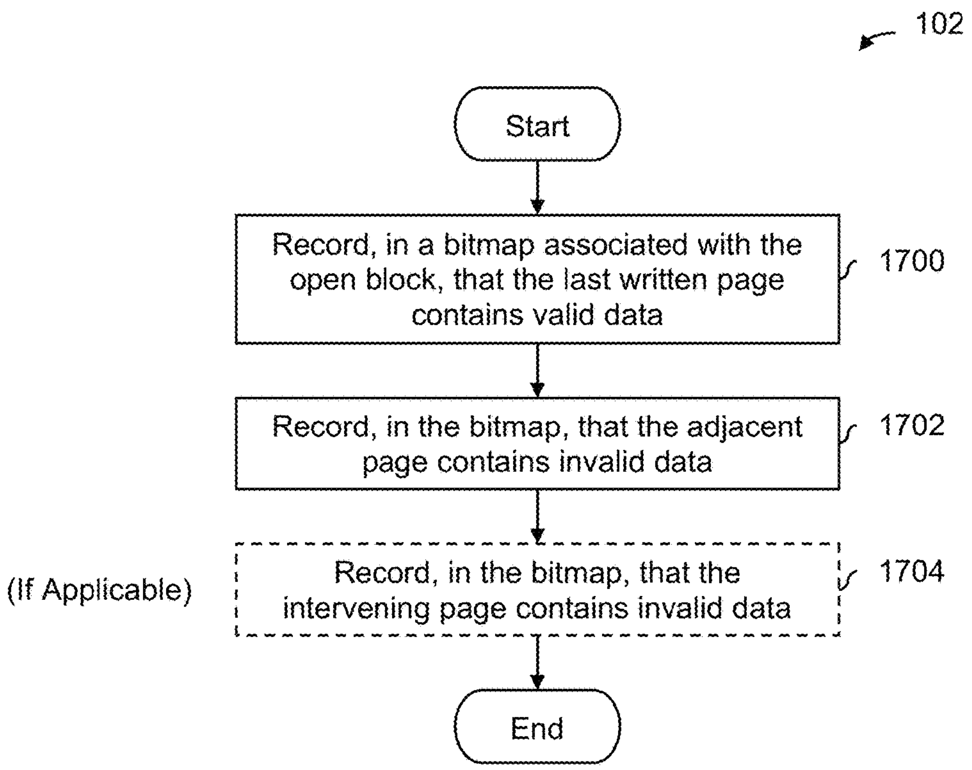
FIG. 17 is a diagram illustrating an embodiment of a process to generate a bitmap.

FIG. 17 is a diagram illustrating an embodiment of a process to generate a bitmap. In some embodiments, the process is performed as part of step 102 in FIG. 1.

At 1700, it is recorded, in a bitmap associated with the open block, that the last written page includes valid data. For example, in bitmap 1610 in FIG. 16, it is recorded that page 16 includes valid data. Similarly, in bitmap 1600 in FIG. 16, it is recorded that page 4 includes valid data.

At 1702, it is recorded, in the bitmap, that the adjacent page includes invalid data. For example, bitmap 1600 in FIG. 16 indicates that page 6 has invalid data and bitmap 1610 indicates that pages 20 and 21 have invalid data.

If applicable, at 1704 it is recorded, in the bitmap, that the intervening page includes invalid data. As an example, in FIG. 16, bitmap 1600 indicates that page 5 has invalid data and bitmap 1610 indicates that pages 17-19 have invalid data. Step 1704 is an optional step which is performed as applicable/appropriate. For example, step 1704 may be performed in embodiments where the process of FIG. 17 is performed in combination with the process of FIG. 10 or FIG. 11.

Figure 18:
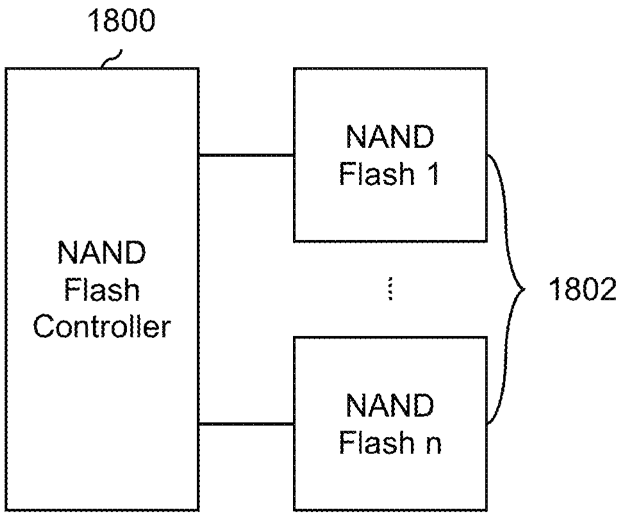
FIG. 18 is a diagram illustrating an embodiment of a NAND flash storage system.

FIG. 18 is a diagram illustrating an embodiment of a NAND flash storage system. In the example shown, a NAND flash controller (1800) controls a plurality of NAND flash (1802). In some embodiments, the NAND flash controller and/or NAND flash are implemented on or using one or more semiconductors. The NAND flash controller is an example of a device which performs the exemplary noise mitigation and/or other management processes described above. In various embodiments, the NAND flash controller includes or is implemented using a general purpose processor, a specifically designed or manufactured processor (e.g., an ASIC), or a specifically configured processor (e.g., an FPGA). The NAND flash is an example of storage which is protected by the exemplary noise mitigation and/or other management processes described above. For example, the NAND flash may include any number of open blocks or erased blocks which are vulnerable to noise as described above. Naturally, in some embodiments, a NAND flash controller may control a single NAND flash. In some embodiments, the example system shown here includes or is otherwise associated with a solid state drive (SSD).

Various embodiments of a technique for reducing the amount of noise have been described above. More specifically, the system identifies situations and/or pages which are vulnerable or susceptible to the unintentional addition of charge (i.e., noise) and eliminates or at least reduces the vulnerability. As described above, this may include writing overheard information to an open block (e.g., to complete a partially-written wordline which is vulnerable to noise), unequally distributing write data amongst a plurality of open blocks so that at least one of the open blocks can be closed (e.g., to reduce the number of open blocks in order to mitigate the amount of overhead information written by a noise reduction process), and/or by not immediately erasing a block which has had its valid data copied off during garbage collection (e.g., so that an erased block does not sit around too long waiting to be programmed).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a memory including negative AND (NAND) flash, the NAND flash comprising a plurality of pages; and a NAND flash controller, wherein the NAND flash controller includes a processor and is configured to:

identify a last written page in an open block in the NAND flash, the last written page having first content; and write second content to an adjacent page in the open block, wherein:

the adjacent page is physically adjacent to the last written page in the open block;

the second content enhances robustness of the first content; and the adjacent page is written in response to a criteria associated with a time threshold and a second criteria associated with an error correction decoding result both being satisfied.

2. The system of claim 1, further comprising a plurality of NAND flash, wherein the system includes a solid state drive (SSD).

3. The system of claim 1, wherein to identify the last written page includes to:

write a page of a write job to the open block in the NAND flash;

determine whether the written page is a last page of the write job;

in the event that it is determined that the written page is the last page of the write job, flag the written page as the last written page and start a timer; and determine whether the timer exceeds or meets the time threshold, wherein the second content is written to the adjacent page in the event it is determined that the timer exceeds or meets the time threshold.

4. The system of claim 1, wherein to identify the last written page includes to:

write a page of a write job to the open block in the NAND flash;

determine whether the written page is a last page of the write job;

in the event it is determined that the written page is the last page of the write job, flag the written page as the last written page and start a timer;

determine whether the timer exceeds or meets a time threshold; and in the event it is determined that the timer exceeds or meets the time threshold:

read the last written page to obtain a read page and perform error correction decoding on the read page to obtain a number of errors;

determine whether the error correction decoding has failed, wherein the second content is written to the adjacent page in the event it is determined that the error correction decoding has failed; and in the event it is determined that the error correction decoding is successful, determine whether the number of errors exceeds or meets an error threshold, wherein the second content is written to the adjacent page in the event it is determined that the number of errors exceeds or meets the error threshold.

5. The system of claim 1, wherein:

to write the second content to the adjacent page includes to write a pseudorandom sequence to the adjacent page; and the NAND flash controller is further configured to:

generate a single parity check sequence based at least in part on the last written page and one or more previously written pages; and write the single parity check sequence to an intervening page which is between the last written page and the adjacent page in a write sequence, wherein pages which are sequentially adjacent to each other in the write sequence are not necessarily physically adjacent to each other.

6. The system of claim 1, wherein:

to write the second content to the adjacent page includes to write a pseudo-random binary sequence to the adjacent page; and the NAND flash controller is further configured to:

generate a single parity check sequence based at least in part on the last written page and one or more previously written pages;

write the single parity check sequence to an intervening page which is between the last written page and the adjacent page in a write sequence, wherein pages which are sequentially adjacent to each other in the write sequence are not necessarily physically adjacent to each other;

read the last written page to obtain a read page and perform error correction decoding on the read page to obtain a number of errors;

determine whether the error correction decoding has failed, wherein in the event it is determined that the error correction decoding has failed, recovered data for the last written page is generated and the recovered data is written to the last written page; and in the event it is determined that error correction decoding is successful, determine whether the number of errors exceeds or meets an error threshold, wherein in the event it is determined that the number of errors exceeds or meets the error threshold, error corrected data is written to the last written page.

7. The system of claim 1, wherein the memory is configured to provide the processor with further instructions which when executed cause the processor to:

receive a write job to write to one or more pages;

determine a least number of open pages associated a plurality of open blocks; and determine whether the number of pages in the write job exceeds or meets the least number of open pages, wherein in the event it is determined that the number of pages in the write job exceeds or meets the least number of open pages:

an open block with the least number of open pages is selected from the plurality of open blocks in order to obtain a selected open block; and the write job is written to the selected open block.

8. The system of claim 1, wherein the memory is configured to provide the processor with further instructions which when executed cause the processor to:

determine a number of erased blocks in a free block pool from which blocks are selected to be written to;

determine whether the number of erased blocks is less than or equal to a threshold number of erased blocks; and in the event it is determined that the number of erased blocks is less than the threshold number of erased blocks, erase an empty block so that the erased block is added to the free block pool.

9. The system of claim 1, wherein to write the second content to the adjacent page includes to:

record, in a bitmap associated with the open block, an indication that the last written page includes valid data; and record, in the bitmap, an indication that the adjacent page includes invalid data.

10. The system of claim 1, wherein to write the second content to the adjacent page includes to:

generate a single parity check sequence based at least in part on the last written page and one or more previously written pages;

write the single parity check sequence to an intervening page that is between the last written page and the adjacent page in a write sequence, wherein pages which are sequentially adjacent to each other in the write sequence are not necessarily physically adjacent to each other;

write a pseudorandom binary sequence to the adjacent page;

record, in a bitmap associated with the open block, an indication that the last written page contains valid data;

record, in the bitmap, an indication that the adjacent page includes invalid data; and record, in the bitmap, an indication that the intervening page includes invalid data.

11. A method, comprising:

using a negative AND (NAND) flash controller to identify a last written page in an open block in NAND flash, wherein:

the NAND flash includes a plurality of pages; and the last written page has first content; and using the NAND flash controller to write second content to an adjacent page in the open block, wherein:

the adjacent page is physically adjacent to the last written page in the open block;

the second content enhances robustness of the first content; and the adjacent page is written in response to a criteria associated with a time threshold and a second criteria associated with an error correction decoding result both being satisfied.

12. The method of claim 11, wherein:

the NAND flash controller and the NAND flash are included in a system which includes a solid state drive (SSD); and the system further includes a plurality of NAND flash.

13. The method of claim 11, wherein identifying the last written page includes:

writing a page of a write job to the open block in the NAND flash;

determining whether the written page is a last page of the write job;

in the event that it is determined that the written page is the last page of the write job, flagging the written page as the last written page and start a timer; and determining whether the timer exceeds or meets the time threshold, wherein the second content is written to the adjacent page in the event it is determined that the timer exceeds or meets the time threshold.

14. The method of claim 11, wherein identifying the last written page includes:

writing a page of a write job to the open block in the NAND flash;

determining whether the written page is a last page of the write job;

in the event it is determined that the written page is the last page of the write job, flagging the written page as the last written page and start a timer;

determining whether the timer exceeds or meets the time threshold; and in the event it is determined that the timer exceeds or meets the time threshold:

reading the last written page to obtain a read page and perform error correction decoding on the read page to obtain a number of errors;

determining whether the error correction decoding has failed, wherein the second content is written to the adjacent page in the event it is determined that the error correction decoding has failed; and in the event it is determined that the error correction decoding is successful, determining whether the number of errors exceeds or meets an error threshold, wherein the second content is written to the adjacent page in the event it is determined that the number of errors exceeds or meets the error threshold.

15. The method of claim 11, wherein:

writing the second content to the adjacent page includes writing a pseudorandom sequence to the adjacent page; and the method further includes:

generating a single parity check sequence based at least in part on the last written page and one or more previously written pages; and writing the single parity check sequence to an intervening page which is between the last written page and the adjacent page in a write sequence, wherein pages which are sequentially adjacent to each other in the write sequence are not necessarily physically adjacent to each other.

16. The method of claim 11, wherein:

writing the second content to the adjacent page includes writing a pseudo-random binary sequence to the adjacent page; and the method further includes:

generating a single parity check sequence based at least in part on the last written page and one or more previously written pages;

writing the single parity check sequence to an intervening page which is between the last written page and the adjacent page in a write sequence, wherein pages which are sequentially adjacent to each other in the write sequence are not necessarily physically adjacent to each other;

reading the last written page to obtain a read page and perform error correction decoding on the read page to obtain a number of errors;

determining whether the error correction decoding has failed, wherein in the event it is determined that the error correction decoding has failed, recovered data for the last written page is generated and the recovered data is written to the last written page; and in the event it is determined that error correction decoding is successful, determining whether the number of errors exceeds or meets an error threshold, wherein in the event it is determined that the number of errors exceeds or meets the error threshold, error corrected data is written to the last written page.

17. The method of claim 11 further comprising:

receiving a write job to write to one or more pages;

determining a least number of open pages associated a plurality of open blocks; and determining whether the number of pages in the write job exceeds or meets the least number of open pages, wherein in the event it is determined that the number of pages in the write job exceeds or meets the least number of open pages, an open block with a least number of open pages is selected from the plurality of open blocks and the write job is written to the selected open block.

18. The method of claim 11 further comprising:

determining a number of erased blocks in a free block pool from which blocks are selected to be written to;

determining whether the number of erased blocks is less than or equal to a threshold number of erased blocks; and in the event it is determined that the number of erased blocks is less than the threshold number of erased blocks, erasing an empty block so that the erased block is added to the free block pool.

19. The method of claim 11, wherein writing the second content to the adjacent page includes:

generating a single parity check sequence based at least in part on the last written page and one or more previously written pages;

writing the single parity check sequence to an intervening page that is between the last written page and the adjacent page in a write sequence, wherein pages which are sequentially adjacent to each other in the write sequence are not necessarily physically adjacent to each other;

writing a pseudorandom binary sequence to the adjacent page;

recording, in a bitmap associated with the open block, an indication that the last written page contains valid data;

recording, in the bitmap, an indication that the adjacent page includes invalid data; and recording, in the bitmap, an indication that the intervening page includes invalid data.

20. A computer program product, the computer program product being embodied in a non-transitory computer readable storage medium and comprising computer instructions for which when executed by a computer processor cause the computer processor to:

identifying a last written page in an open block in NAND flash, wherein:

the NAND flash includes a plurality of pages; and the last written page has first content; and writing second content to an adjacent page in the open block, wherein:

the adjacent page is physically adjacent to the last written page in the open block, the second content enhances robustness of the first content; and the adjacent page is written in response to a criteria associated with a time threshold and a second criteria associated with an error correction decoding result both being satisfied.

* * * * *

UNITED STATES PATENT AND TRADEMARK OFFICE

CERTIFICATE OF CORRECTION

PATENT NO. : 10,198,217 B2
APPLICATION NO. : 15/343546
DATED : February 5, 2019
INVENTOR(S) : Shu Li It is certified that error appears in the above-identified patent and that said Letters Patent is hereby corrected as shown below:

In the Specification

In Column 8, Line 59, before "corrected" delete "1s" and insert --0s--, therefor.

In the Claims

In Column 20, Claim 20, Line 42, after "block" delete "," and insert --;--, therefor.

Signed and Sealed this
Tenth Day of September, 2019

Andrei Iancu
*Director of the United States Patent and Trademark Office*